United States Patent Office 3,417,080
Patented Dec. 17, 1968

3,417,080
SULFAMYLANTHRANILIC ACID AMIDES AND
PROCESS FOR PREPARING THEM
Karl Sturm, Frankfurt am Main, Walter Siedel, Bad Soden, Taunus, and Rudi Weyer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 3, 1965, Ser. No. 511,330
Claims priority, application Germany, Dec. 8, 1964, F 44,629
7 Claims. (Cl. 260—239.6)

ABSTRACT OF THE DISCLOSURE

Diuretically, saluretically and hypotensively active compounds of the formula

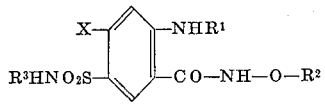

wherein $R^1$ represents benzyl, furfuryl or thenyl-(2), $R^2$ represents hydrogen or alkyl with 1 to 3 carbon atoms which may be straight-chained or branched, $R^3$ represents hydrogen or methoxy and X represents chlorine or bromine.

---

The present invention relates to a process for preparing sulfamylanthranilic acid amides of the general Formula I

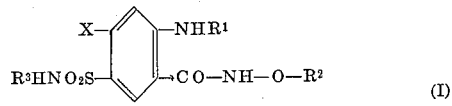

wherein $R^1$ represents a benzyl, furfuryl or thenyl-(2) group, $R^2$ represents a hydrogen atom or a straight-chained or branched alkyl group having 1 to 3 carbon atoms, $R^3$ represents a hydrogen atom or a methoxy group, and X stands for a chlorine or bromine atom, which comprises reacting (a) a dihalogeno-sulfamylbenzoic acid amide of the general Formula II

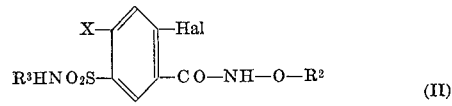

wherein Hal represents a halogen atom, with an amine of the general Formula III $$NH_2R^1 \quad (III)$$

or (b) a reactive derivative of a sulfamylanthranilic acid of the general Formula IV

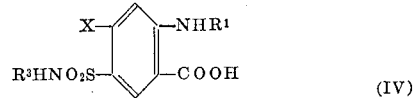

with a compound of the general Formula V $$H_2N-O-R^2 \quad (V)$$

As starting components of the general Formula II which are suitable for use according to method (a) there may be mentioned, for example: the hydroxamides, methhoxamides, ethoxamides, propoxamides or isopropoxamides of the following dihalogeno-sulfamyl-benzoic acids: 3-sulfamyl-4,6-dichlorobenzoic acid, 3-sulfamyl-4,6-dibromobenzoic acid, 3-sulfamyl-4-chloro-6-bromo-benzoic acid, 3-sulfamyl-4-chloro-6-fluoro-benzoic acid, 3-sulfamyl-4-bromo-6-fluoro-benzoic acid. The dihalogeno-sulfamyl-benzoic acids mentioned are known compounds. For the preparation of the corresponding hydrox- or lacoxamides of sulfamylbenzoic acids of the general Formula II, in which $R^3$ stands for a hydrogen atom, the dihalogeno-sulfamylbenzoic acids mentioned are reacted at temperatures between 80° and 100° C., if desired with addition of dioxane as diluent, with an excess of thionylchloride, the thionylchloride and solvent which have not been consumed are removed by distillation in vacuo, and the carboxylic acid chloride which is usually obtained in amorphous state is reacted in aqueous tetrahydrofurane, without further purification, at temperatures within the range from 0° to 20° C., with an excess of an amine of the general Formula V. It is likewise advantageous to carry out the reaction with an equivalent amount of said amine in pyridine. When the reaction is terminated the reaction solution is, in each case, poured into dilute acetic acid and the separated amide is purified by recrystallisation from a mixture of ethanol and water, from benzene or from a mixture of ethyl-acetate and petroleum ether. As amines of the general Formula V there may be used, for example, O-methyl-hydroxylamine, O-ethyl-hydroxylamine, O-n-propyl-hydroxylamine or O-isopropyl-hydroxylamine.

In order to obtain the starting substances of the general Formula II, in which $R^3$ represents a methoxy group, the corresponding 3-methoxysulfamyl-4,6-dihalogeno-benzoic acids are converted in the manner described above via the corresponding acid chloride into the corresponding hydrox- or alcoxamides. The preparation of said 3-alcoxysulfamyl-4,6,-dihalogeno-benzoic acids is described in U.S. patent application Ser. No. 470,231, now Patent No. 3,351,589.

The halogen exchange reaction with the amines of the general Formula III, benzylamine, furfuryl- and thenyl-(2)-amine, according to (a) is carried out at temperatures within the range from 50° to 120° C. The temperature preferred for the exchange of a fluorine atom is within the range from 60° to 80° C., and for the exchange of a chlorine or bromine atom within the range from 80° to 110° C.

For complete reaction at least 2 equivalents of an amine of the general Formula III are required, since 1 equivalent of hydrohalic acid must be bound. It is advantageous to use an excess of 3 to 5 equivalents of the amine, which will accelerate the reaction. Moreover, the reaction mixture remains liquid and it is not necessary to add any solvent. It is, however, also possible, especially when reacting the valuable amine components furfuryl- or thenyl-(2)-amine, to use only 1 equivalent of the base and to add a tertiary amine, for example pyridine, triethyl-amine or dimethylaniline, as acid-binding agent, and, if required an inert solvent miscible with water, such, for example, as methanol, ethanol, isopropanol, tetrahydrofurane, dioxane, ethylene-glycol-monomethyl ether or diethylene-glycol-dimethyl ether. In order to be worked up the solution obtained is poured into diluate acetic acid, whereupon the final products of the general Formula I usually precipitate in crystalline state. For further purification they are advantageously recrystallized from ethanol or from a mixture of ethanol and water, if desired with addition of charcoal.

The process of the present invention is based on the surprising fact, which could not be foreseen, that a carbonamide group, which is generally not characterized by a distinct activating property, activates the halogen atom in ortho-position to such a degree that it is exchanged easily by means of the amines mentioned, whereas the chlorine atom in para-position is not affected.

The method described sub (a) is, however, less suitable for the preparation of products of the general Formula I in which $R^2$ is a hydrgoen atom, since at the reaction temperatures required for the exchange of halogen some of the corresponding hydroxamides of the general Formula II already enter secondary reactions.

The products of the invention may also be prepared according to the method described sub (b) by reacting reactive functional derivatives of carboxylic acids of the general Formula IV with amines of the general Formula V. The carboxylic acids of the general Formula IV in which $R^3$ stands for a hydrogen atom are known compounds. Those of the carboxylic acids of the general Formula IV in which $R^3$ represents the methoxy group are described in U.S. Patent application Ser. No. 470,231, filed July 7, 1965, now Patent No. 3,351,589. As reactive derivatives of said acids of the general Formula IV there may be used, in particular, the symmetric anhydride, a mixed anhydride, the azide, activated esters such, for instance, as nitrophenyl ester, cyanomethyl ester, thiophenyl ester, N-hydroxy-phthalimido ester and, if $R^1$ represents a benzyl radical, likewise the carboxylic acid chloride. Moreover, the activated intermediates can also be produced in situ by means of the condensing agents known from the peptide chemistry, for example dicyclohexylcarbodiimide, carbonyldiimidazole, phosphoroxy chloride, diethylchlorophosphite or tetraethylpyrophosphite.

It is particuarly advantageous to use the symmetric anhydride of an acid of the general Formula IV, which can be prepared easily from the corresponding acid by means of dicyclohexylcarbodiimide in tetrahydrofurane, which crystallizes well, can be stored for any period of time and gives almost quantitative yields in carbonamide.

The mixed anhydride can be prepared, for example, by reaction of the acid in question with equivalent amounts of chloroformic acid ethylester and triethylamine in absolute tetrahydrofurane at a temperature within the range from $-10°$ to $0°$ C., the chloride by reaction with an excess of thionylchloride at a temperature between $50°$ and $90°$ C. The activated esters are advantageously prepared by reacting the chloride at a temperature between $0°$ and $10°$ C. in an inert solvent, in the presence of 1 equivalent of triethylamine, with the corresponding alcohols. In order to prepare the azide the chloride is transformed into the hydrazide in the usual manner and the latter reacted at $0°$ C. with 1 equivalent of nitrous acid.

When preparing the products of the invention according to method (b) it is advantageous to introduce the reactive derivative of a carboxylic acid of the general Formula IV portionwise at room temperature into a solution of excessive hydroxylamine, O-methyl-hydroxylamine, O-ethyl-hydroxylamine, O-n-propyl-hydroxylamine or O-isopropyl-hydroxylamine and to complete the reaction of the chloride, the azide or the mixed anhydride at a temperature within the range from $0°$ to $20°$ C. The reaction of the symmetric anhydride with the activated ester is carried out by heating the whole for a short period of time to elevated temperatures of up to about $60°$ C., preferably within the range from $30°$ to $50°$ C., until completely dissolved. The mixture is then diluted with water, its pH-value adjusted to 7.0–7.5 by means of an acid such as acetic acid, and the reaction product of the general Formula I is allowed to crystallize at lower temperatures, for example at $0°$ C. This method of operation may be applied to the symmetric anhydride of the starting components as well as to the corresponding carboxylic acid chloride or azide or to an activated carboxylic acid ester.

The reaction via a mixed anhydride is advantageously carried out without isolation of said anhydride by dissolving equimolar amounts of an acid of the general Formula IV and chloroformic acid ethylester in absolute tetrahydrofurane, adding the equimolar amount of anhydrous triethylamine at $0°$ C. and, 10 minutes after the addition has been finished adding in one portion, likewise at $0°$ C., a base of the general Formula V in an excess of 1.5 times to twice its molar amount. The whole is then allowed to react at room temperature for about one hour, the reaction solution is concentrated, diluted with water, and the final product of the general Formula I is allowed to crystallize at a pH value of 7.0–7.5.

The products of the general Formula I are distinguished by an excellent diuretic and saluretic activity, reduced separation of potassium and a very low toxicity. As compared with known analogous compounds of similar constitution, the products of the invention show the same general effect, but a considerably prolonged period of activity. The novel compounds, especially the 4-chloro-N-[2-furfuryl] - 5 - sulfamyl - methoxamide or -hydroxamide, may therefore be used with particular advantage in the edema therapy, when careful dehydration is desired. The compounds of the invention have hypotensive properties, but may also be used in combination with hypotensively active compounds for the treatment of hypertonia.

The products of the invention, in the form of dosage units of about 10 to 100 mg., can be administered orally as well as parenterally. They can be processed into tablets, dragees, capsules or ampoules, advantageously in admixture or conjunction with the usual pharmaceutical carriers such, for example, as starch, lactose, tragacanth or magnesium stearate.

The following examples serve to illustrate the invention but they are not intended to limit it thereto.

EXAMPLE 1

4-chloro-N-[furfuryl]-5-sulfamyl-anthranilic acid methoxamide

In the solution of 2.0 grams of O-methyl-hydroxylamine in 50 cc. of 50% aqueous tetrahydrofurane 6.44 grams of the symmetric anhydride of 4-chloro-N-[furfuryl]-5-sulfamyl-anthranilic acid (10 mols) are introduced at room temperature, the mixture is heated for 5 minutes to $60°$ C., the clear reaction solution diluted with 100 cc. of water, and its pH-value adjusted to 7.5 by means of 2 N-sodium carbonate. After having been allowed to stand overnight at $0°$ C., the methoxamide is filtered with suction and washed with water. There are obtained colorless prisms melting at $165°$ C. Yield: 3.1 grams.

The 4-chloro-N-[furfuryl]-5-sulfamyl-anthranilic acid anhydride used as starting material can be prepared in the following manner:

To the solution of 66.2 grams of 4-chloro-N-[furfuryl]-5-sulfamyl-anthranilic acid in 0.6 liter of tetrahydrofurane 41.2 grams of dicyclohexyl-carbodiimide are added. After the whole has been allowed to stand for 18 hours at room temperature the unreacted carbodiimide is decomposed by addition of 10 cc. of glacial acetic acid, the precipitated dicyclohexyl-urea is filtered with suction, and the filtrate concentrated by evaporation. The crystalline crude product is liberated from the by-products by boiling with 0.8 liter of ethanol, it is then dissolved in 0.2 liter of dimethylformamide while being slightly heated and reprecipitated in crystalline state at room temperature by portionwise addition of a total amount of 0.2 liter of water. After having been washed with dimethylformamide of 50% strength and water, the product is dried in the air. Yield: 38 grams of yellowish prisms which decompose at 183–185° C. while darkening.

EXAMPLE 2

4-chloro-N-[furfuryl]-5-sulfamyl-anthranilic acid hydroxamide

To a solution of 13.8 grams of hydroxylamine-hydrochloride (0.2 mol) in 40 cc. of water there are added, while cooling with ice, first 40 cc. of 5 N-sodium hydroxide solution and then 60 cc. of tetrahydrofurane. Into the mixture obtained 12.9 grams of the symmetric anhydride of 4-chloro-N-[furfuryl]-5-sulfamyl-anthranilic acid (20 millimols) are introduced at room temperature while stirring, and stirring is continued for another hour. After the reaction solution has been diluted with 0.2 liter of water and the pH-value adjusted to 7.5 by means of 2 N- sodium carbonate, the hydroxamide is precipitated in crystalline state by cooling it for several hours in ice water and is then recrystallized from 100 cc. of water. Yield: 4.3 grams of colorless crystals which decompose at 167° C.

EXAMPLE 3

4-chloro-N-[furfuryl]-5-sulfamyl-anthranilic acid ethoxamide

A mixture of 31.3 grams of 2.4-dichloro-5-sulfamyl-benzoic acid ethoxamide (melting point 207° C.) (0.1 mol), prepared from 2,4-dichloro-5-sulfamyl-benzoic acid chloride and O-ethyl-hydroxylamine, and 50 cc. of furfurylamine is stirred for 1 hour at 100° C. The clear reaction solution is poured into 1.0 liter of acetic acid of 5% strength, and the condensation product which has precipitated in solid state is recrystallized from ethanol of 50% strength, while adding charcoal. There are obtained colorless prisms melting at 194° C. Yield: 22.5 grams.

EXAMPLE 4

4-chloro-N-benzyl-5-sulfamyl-anthranilic acid methoxamide 32.2 grams of 4-chloro-N-benzyl-5-sulfamyl-anthranilic acid chloride are introduced portionwise, within 15 minutes, while cooling with ice and stirring, into a solution of 15 grams of O-methyl-hydroxylamine in 0.3 liter of tetrahydrofurane of 80% strength. Immediately afterwards the mixture is concentrated to one third of its volume, 0.2 liter of water are added and the pH-value is adjusted to 7.5. The crude product which has precipitated in crystalline state is purified by recrystallisation from a mixture of ethanol and water, while adding decolorizing charcoal. Yield: 21.8 grams; melting point: 187° C.

The 4 - chloro - N - benzyl - 5-sulfamyl-anthranilic acid chloride required as starting material can be prepared in the following manner:

To a solution of 34.1 grams of 4-chloro-N-benzyl-5-sulfamyl-anthranilic acid in 100 cc. of dioxane are dropwise added, at 80° C., while stirring, 20.0 cc. of thionylchloride, and stirring is continued at this temperature for 15 minutes. From the reaction solution which has been cooled to room temperature the chloride is precipitated in the form of an oil by means of 0.3 liter of petroleum ether and crystallizes when triturated with further amounts of petroleum ether.

EXAMPLE 5

4-chloro-N-benzyl-5-sulfamyl-anthranilic acid-isopropoxamide 25 grams of O-isopropyl-hydroxylamine are reacted in the manner described in Example 4 with 32.3 grams of 4 - chloro - N-benzyl-5-sulfamyl-anthranilic acid chloride, and the amide is recrystallized from a mixture of ethanol and water. Yield: 22.5 grams, colorless prisms melting at 162° C.

EXAMPLE 6

4-chloro-N-[2-thenyl]-5-sulfamyl-anthranilic acid methoxamide 28.3 grams of 2 - fluoro - 4-chloro-5-sulfamyl-benzoic acid methoxamide (melting point 220° C.) (0.1 mol) are heated for one hour on the steam bath while stirring with 60 cc. of 2-thenylamine. The reaction solution is poured into 0.6 liter of acetic acid of 10% strength. A light yellow resin separates which in the course of several hours crystallizes at room temperature. For purification the product is recrystallized from a mixture of ethanol and water, while adding decolorizing charcoal. Melting point: 168–169° C.; yield: 19.0 grams.

We claim:
1. Sulfamylanthranilic acid amide of the formula

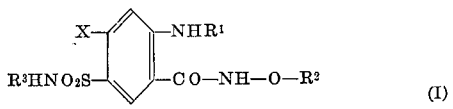

wherein $R^1$ represents benzyl, furfuryl or thenyl-(2), $R^2$ represents hydrogen or alkyl with 1 to 3 carbon atoms which may be straight-chained or branched, $R^3$ represents hydrogen or methoxy and X represents chlorine or bromine.

2. 4 - chloro - N-[furfuryl]-5-sulfamyl-anthranilic acid methoxamide.

3. 4 - chloro - N-[furfuryl]-5-sulfamyl-anthranilic acid hydroxamide.

4. 4 - chloro - N-[furfuryl]-5-sulfamyl-anthranilic acid ethoxamide.

5. 4 - chloro - N - benzyl-5-sulfamyl-anthranilic acid methoxamide.

6. 4 - chloro - N-(2-thenyl)-5-sulfamyl-anthranilic acid methoxamide.

7. 4 - chloro - N - benzyl-5-sulfamyl-anthranilic acid isopropoxamide.

References Cited

UNITED STATES PATENTS

| | | | |
|---|---|---|---|
| 3,186,992 | 6/1965 | Hoefle | 260—256.5 |
| 3,058,882 | 10/1962 | Sturm et al. | 260—239.6 |
| 3,043,874 | 7/1962 | De Wold et al. | 260—556 |

HENRY R. JILES, *Primary Examiner.*

H. I. MOATZ, *Assistant Examiner.*

U.S. Cl. X.R.

167—51.5, 65; 260—556, 397.7